United States Patent [19]

Shimizu

[11] 4,396,197
[45] Aug. 2, 1983

[54] OIL SEAL DEVICE FOR HIGH-SPEED ROTARY MACHINE

[75] Inventor: Masami Shimizu, Chiba, Japan

[73] Assignee: Ishikawajima-Harima Jukogyo Kabushiki Kaisha, Tokyo, Japan

[21] Appl. No.: 315,722

[22] Filed: Oct. 28, 1981

[30] Foreign Application Priority Data

Jan. 16, 1981 [JP] Japan .............................. 56-4805[U]

[51] Int. Cl.³ .............................................. F16J 15/42
[52] U.S. Cl. .................................... 277/67; 277/133; 415/175
[58] Field of Search .................... 277/67, 133, 12, 13; 415/170 R, 175

[56] References Cited

U.S. PATENT DOCUMENTS 3,053,541 9/1962 Dega ...................... 277/67

4,314,705 2/1982 Shimizu ............................... 277/67

FOREIGN PATENT DOCUMENTS 406192 2/1934 United Kingdom ................. 277/67

Primary Examiner—Robert I. Smith
Attorney, Agent, or Firm—Scrivener, Clarke, Scrivener and Johnson

[57] ABSTRACT

One end of a casing in which a rotating shaft is supported by a floating metal bush is extended to surround the outer periphery of an oil thrower formed adjacent to an end of the shaft so that an oil-thrower space is defined by the shaft, the oil thrower, the casing and the floating metal bush, and an arcuate opening is formed through the wall of the casing so that the lubricating oil trapped in the oil-thrower space is discharged through this opening to an oil outlet.

2 Claims, 4 Drawing Figures

OIL SEAL DEVICE FOR HIGH-SPEED ROTARY MACHINE

BACKGROUND OF THE INVENTION

The present invention relates to an oil seal device for a high-speed rotary machine such as turbochargers.

In FIG. 1 is shown a prior art oil seal device for a high-speed rotary machine. A floating metal bush b is mounted on a casing a and is pressed against a rotating shaft c. The rotating shaft c is formed with an oil thrower d and an annular groove e into which is fitted a seal ring f. A lubricating oil is supplied through an oil passage g formed in the casing a, lubricates the floating metal bush b and is directed to flow into spaces h and i on both sides of the floating metal bush b.

The lubricating oil which flows into the space i can flow further to a discharge port (not shown), but the lubricating oil which flows into the space h tends to leak into the space j outwardly of the seal ring f. The lubricating oil is thrown outwardly by the oil thrower d rotating at a high speed, and the oil which has not been thrown away and has passed past the oil thrower d is blocked by the seal ring f. However, depending upon the quantity of oil supplied through the oil passage g and the rotational speed of the shaft c, the seal ring cannot prevent the leakage of the oil. Especially in the case of a turbocharger, excessive leakage into the space j occurs when the pressure on the side of a turbine k (or a blower) is low. The prior art oil seal device has a further defect that after a long period of operation, carbon particles are accumulated between surfaces A and B of the casing a, forming the so-called carbon bridge which clogs the passage of oil. As a result, the flow or leakage of oil into the space j is accelerated so that the operation of the turbocharger cannot be continued.

The primary object of the present invention is therefore to provide an oil seal arrangement which can substantially solve the above-described problem, can ensure the stable sealing effects and can prevent the formation of carbon bridges at the oil thrower.

The present invention will become more apparent from the following description of a preferred embodiment thereof taken in conjunction with the accompanying drawings.

DETAILED DESCRIPTION OF THE PREFERRED EMBODIMENT

Figure 1:
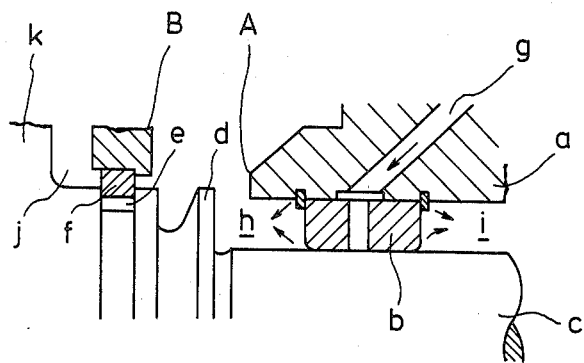
FIG. 1 is a fragmentary sectional view of a prior art oil seal device.
Figure 2:
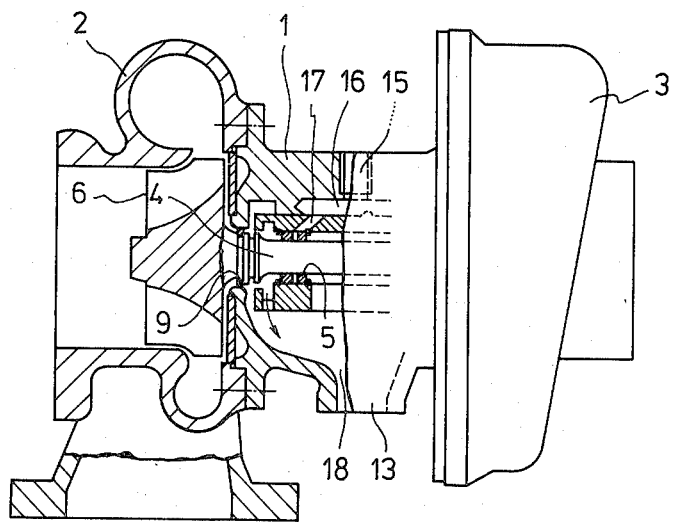
FIG. 2 is a longitudinal sectional view of a turbocharger incorporating an oil seal device in accordance with the present invention.
Figure 3:
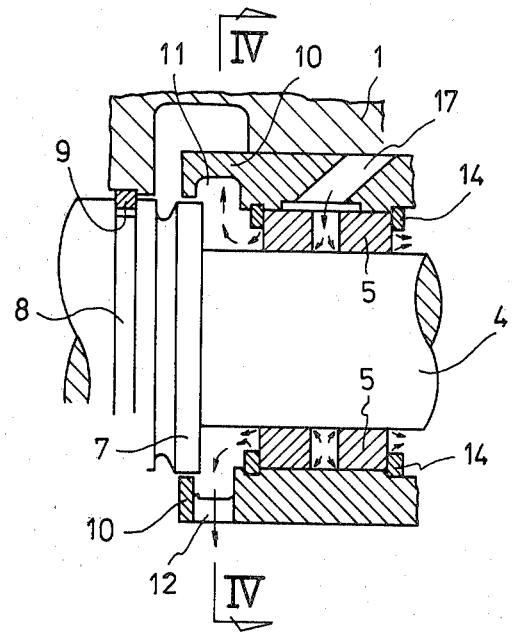
FIG. 3 is a longitudinal sectional view, on enlarged scale, of the oil seal device shown in FIG. 2.

In FIG. 2 is shown a turbocharger incorporating an oil seal device in accordance with the present invention. A turbine casing 2 and a blower casing 3 are interconnected through a bearing casing 1. A common shaft 4 which extends through the bearing casing 1 is supported by a floating metal bush 5 and carries a turbine wheel 6 at one end in the turbine casing 2 and a blower wheel (not shown) at the other end in the blower casing 3. Exhaust gases drive the turbine which in turn drives the blower. The end portion on the side of the turbine casing 2 of the shaft 4 is formed with an oil thrower 7 and an annular groove 8 into which if fitted a seal ring 9.

Figure 4:
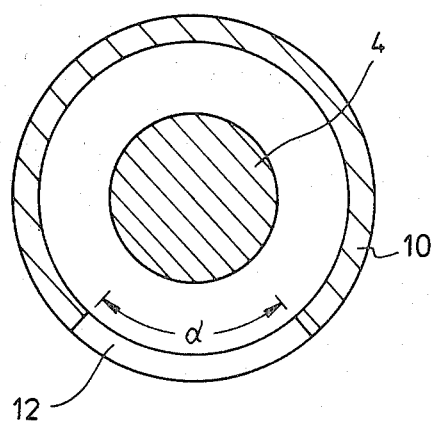
FIG. 4 is a sectional view thereof taken along the line IV—IV of FIG. 3.

One end of a bearing bush 10 upon which is mounted the floating metal bush 5 extends to surround the outer periphery of the oil thrower 9 so that an oil-thrower space 11 is defined between the shaft 4, the oil thrower 7, the floating metal bush 5 and the bearing bush 10. The bearing bush 10 is formed with an arcuate opening 12 through which the oil trapped in the space 11 flows to an oil outlet 13. The angle α subtended by the opening 12 is between 90° and 110° as shown in FIG. 4. This range of angle has been determined from the data from the extensive experiments conducted by the inventor. If the subtended angle is too small, the discharge of oil is hindered, but if it is too large, the leakage to the turbine casing results as the prior art oil seal device.

Reference numeral 14 designates snap rings for preventing the axial movement of the floating metal bush 5; 15, an oil inlet; 16, an oil distribution groove; 17, a branch groove to the floating metal bush 5; and 18, an oil discharge chamber.

The lubricating oil is forced to flow from the inlet 15 through the groove 16 and the branch groove 17 to the floating metal bush 5. After the lubrication of the floating metal bush 5, part of the lubricating oil flows toward the blower and drops into the oil outlet 13 to be discharged to the exterior. Almost all the lubricating oil which flows toward the turbine is trapped in the space 11 without reaching the oil thrower 7, and is discharged through the opening 12 of the bearing bush 10. As a result, almost no oil flows toward the oil thrower 7 and the seal ring 9, and function or burden of preventing the leakage of oil of the oil thrower 7 and the seal ring 9 can be considerably relieved.

It is to be understood that the present invention is not limited to the embodiment described above and that the oil seal device of the present invention can be provided on the side of the blower. Furthermore, the present invention may be equally applied to various high-speed rotary machines other than turbochargers.

The effects and features of the present invention may be summarized as follows:

(1) One end of the bearing bush extends to surround the outer periphery of the oil thrower on the shaft so that oil-thrower space is defined between the shaft, the oil thrower, the floating metal bush and the bearing bush. As result, the lubricating oil flowing past the floating metal bush is almost completely trapped in this space. The oil thrower can perfectly accomplish its function. Thus, regardless of the rotational speed of the shaft, the quantity of lubricating oil supplied and other conditions, stable, reliable and dependable sealing effects can be ensured.

(2) Carbon bridges are formed at the exterior of the oil thrower but hardly formed across the inside walls of the oil-thrower space because the temperature is relatively low in this space. Furthermore, the carbon particles are discharged through the arcuate opening of the bearing bush. The oil seal device of the present invention is therefore adapted especially for use in small-sized turbochargers used with gasoline engines which have seals subjected to high temperatures.

(3) The angle subtended by the arcuate opening formed through the wall of the bearing bush is selected between 90° and 110° so that the discharge of oil from the oil-thrower space is facilitated and the leakage past the seal ring can be prevented.

What is claimed is:

1. An oil seal for a rotary machine in which there is a rotating shaft having an oil thrower ring and a casing surrounding and spaced from the shaft and the oil thrower ring and having an outlet opening therein, comprising:
   (a) an annular floating metal bushing surrounding and engaging the shaft and axially spaced from the oil thrower ring,
   (b) an annular bearing bushing between and engaging the casing and the floating bushing and having an annular part extending axially from the floating bushing toward and overlying the oil thrower ring, thereby forming an oil thrower space between the oil thrower ring, the floating bushing, the bearing bushing and the shaft for the reception of oil from the oil thrower ring,
   (c) communicating oil inlet openings in the casing, the bearing bushing and the floating bushing through which oil is supplied to the shaft,
   (d) the lower part of the bearing bushing which overlies the oil thrower space having an elongated arcuate opening therein through which oil from the oil thrower space is removed.

2. An oil seal device as set forth in claim 1 wherein the angle subtended by said arcuate opening is between 90° and 110°.

* * * * *